(12) United States Patent
Bartolucci et al.

(10) Patent No.: US 11,694,198 B2
(45) Date of Patent: Jul. 4, 2023

(54) SYSTEM AND METHOD FOR TRANSFERRING RESOURCES USING A BLOCKCHAIN

(71) Applicant: nChain Licensing AG, Zug (CH)

(72) Inventors: Silvia Bartolucci, London (GB); Pauline Bernat, London (GB); Daniel Joseph, London (GB); Craig Steven Wright, London (GB)

(73) Assignee: nChain Licensing AG, Zug (CH)

( * ) Notice: Subject to any disclaimer, the term of this patent is extended or adjusted under 35 U.S.C. 154(b) by 155 days.

(21) Appl. No.: 16/968,545

(22) PCT Filed: Feb. 1, 2019

(86) PCT No.: PCT/IB2019/050811
§ 371 (c)(1),
(2) Date: Aug. 7, 2020

(87) PCT Pub. No.: WO2019/155331
PCT Pub. Date: Aug. 15, 2019

(65) Prior Publication Data
US 2021/0042747 A1 Feb. 11, 2021

(30) Foreign Application Priority Data
Feb. 8, 2018 (GB) ..................... 1802063

(51) Int. Cl.
*G06Q 20/22* (2012.01)
*G06Q 20/38* (2012.01)
(Continued)

(52) U.S. Cl.
CPC ..... *G06Q 20/3829* (2013.01); *G06Q 20/0658* (2013.01); *G06Q 20/223* (2013.01);
(Continued)

(58) Field of Classification Search
CPC ............ G06Q 20/382; G06Q 20/3829; G06Q 2220/00; G06Q 20/02; G06Q 20/065;
(Continued)

(56) References Cited

U.S. PATENT DOCUMENTS 10,050,779 B2  8/2018 Alness et al.
10,805,090 B1 * 10/2020 Poelstra .................... H04L 9/50
(Continued)

FOREIGN PATENT DOCUMENTS

CN      106779704 A  *  5/2017
CN      107659411 A  *  2/2018 .......... G06Q 20/382
WO  WO-2015171580 A1 * 11/2015 ............. G06Q 20/02

OTHER PUBLICATIONS

Florian Tschorsch, Bitcoin and Beyond: A Technical Survey on Decentralized Digital Currencies, IEEE, 2016 (Year: 2016).*
(Continued)

*Primary Examiner* — Neha Patel
*Assistant Examiner* — Chunling Ding
(74) *Attorney, Agent, or Firm* — Davis Wright Tremaine LLP

(57) ABSTRACT

A computer-implemented includes sending a public key associated with a particular node in a cyclically-ordered set of nodes participating in a blockchain network to an initiator node; receiving, by the particular node from a node immediately previous to the particular node in the cyclically-ordered set, a first value based on public keys associated with each node from the particular node through to the initiator node; determining a locking value based on the first value and the public key associated with the particular node; and preparing using the locking value, a transaction arranged to transmit control of a resource from a source address associated with the particular node to a receiving address of a node immediately subsequent to the particular
(Continued)

node. The control of the resource is to be transmitted responsive to satisfaction of an execution condition including supply of an unlocking value corresponding to the locking value.

19 Claims, 14 Drawing Sheets

(51) Int. Cl.
    *G06Q 20/06* (2012.01)
    *H04L 9/06* (2006.01)
    *H04L 9/32* (2006.01)
    *H04L 9/00* (2022.01)

(52) U.S. Cl.
    CPC .......... *H04L 9/0618* (2013.01); *H04L 9/3252* (2013.01); *H04L 9/50* (2022.05)

(58) Field of Classification Search
    CPC ............. G06Q 20/223; G06Q 20/3825; G06Q 20/3827; G06Q 20/389; G06Q 20/0658; G06Q 20/36; H04L 9/30; H04L 9/3247; H04L 9/50; H04L 9/3239; H04L 9/0618; H04L 9/3252
    See application file for complete search history.

(56) References Cited

U.S. PATENT DOCUMENTS

| | | | |
|---|---|---|---|
| 2016/0275461 A1* | 9/2016 | Sprague | H04W 12/06 |
| 2016/0358165 A1* | 12/2016 | Maxwell | H04L 9/50 |
| 2019/0028278 A1* | 1/2019 | Gilson | H04L 9/3247 |
| 2019/0095879 A1* | 3/2019 | Eyal | G06Q 20/223 |
| 2019/0273620 A1* | 9/2019 | Wu | H04L 9/3073 |

OTHER PUBLICATIONS

Rebekah Mercer, Privacy on the Blockchain: Unique Ring Signatures, 2016 (Year: 2016).*
Tim Ruffing, CoinShuffle: Practical Decentralized Coin Mixing for Bitcoin, 2014 (Year: 2014).*
Shen Noether, Ring Confidential Transactions, 2016 (Year: 2016).*
Antonopoulos, "Mastering Bitcoin—Unlocking Digital Cryptocurrencies," O'Reilly Media, Inc., Dec. 20, 2014, 282 pages.
Bentov et al., "How to Use Bitcoin to Design Fair Protocols," Annual Cryptology Conference, 2014, 38 pages.
Burchert et al., "Scalable Funding of Bitcoin Micropayment Channel Networks," Royal Society Open Science, Aug. 29, 2018, 18 pages.
Green et al., "Bolt: Anonymous Payment Channels for Decentralized Currencies," CCS'17, Oct. 30-Nov. 3, 2017, 17 pages.
Heilman et al., "Blindly Signed Contracts: Anonymous On-Blockchain and Off-Blockchain Bitcoin Transactions," International Conference on Financial Cryptography and Data Security, Feb. 22, 2016, 15 pages.
International Search Report and Written Opinion dated Apr. 16, 2019, Patent Application No. PCT/IB2019/050811, 11 pages.
Kumaresan et al., "How to Use Bitcoin to Incentivize Correct Computations," retrieved from https://people.csail.mit.edu/ranjit/papers/incentives.pdf, Nov. 2014, 12 pages.
Liu et al., "Enhancing Anonymity of Bitcoin Based on Ring Signature Algorithm," 2017 13th International Conference on Computational Intelligence and Security, Dec. 15-18, 2017, 6 pages.
Malavolta et al., "Concurrency and Privacy with Payment-Channel Networks," 2017 ACM SIGSAC Conference, Oct. 2017, 27 pages.
Merger, "Privacy on the Blockchain: Unique Ring Signatures," MSc Dissertation, Dec. 25, 2016, 43 pages.
Mukhamedov et al., "Analysis of a Multi-Party Fair Exchange Protocol and Formal Proof of Correctness in the Strand Space Model," International Conference on Financial Cryptography and Data Security, Feb. 28, 2005, 15 pages.
Nakamoto, "Bitcoin: A Peer-to-Peer Electronic Cash System," Bitcoin, Oct. 31, 2008, https://bitcoin.org/bitcoin.pdf, 9 pages.
Satoshi et al., "Connection Limits," Bitcoin Forum, Aug. 9, 2010, https://bitcointalk.org/index.php?topic=741.0; prev_next=prev, 2 pages.
UK Commercial Search Report dated Jun. 20, 2018, Patent Application No. GB1802063.6, 6 pages.
UK IPO Search Report dated Jul. 18, 2018, Patent Application No. GB1802063.6, 9 pages.
Wilkinson, "Introduction to Micropayment Channels," retrieved from http://super3.org/introduction-to-micropayment-channels/, Apr. 13, 2016, 4 pages.

* cited by examiner

| $T_c : U_i \to U_{(i+1) \bmod n}$ | |
|---|---|
| 100 | Transaction-ID |
| Version Number | Version number |
| <#> | Number of inputs |
| <Ref> | Prev Trans Output |
| <#> | Prev Trans Output index |
| Script length | Script length |
| <Script> | ScriptSig |
| <ScriptSignatureFlags> | ScriptSig |
| Sequence number | Sequence number |
| <#> | Number of Outputs |
| xBTC | Output value |
| Output Script Length | Output script length |
| redeemScript:<br>OP_IF<br>   OP_2 <pubkey $U_i$> <pubkey $U_{i+1}$> OP_2<br>OP CHECKMULTISIG<br>OP_ELSE<br>  <basepoint G> OP_ECPMULT <$Q_{i+1}$> OP_EQUALVERIFY<br><pubkey $U_{i+1}$> OP_CHECKSIG<br>OP_ENDIF<br><br>ScriptPupkey:<br>OP_HASH160 <$H(redeemScript)$> OP_EQUAL | Output script |
| LockTime | LockTime |

| | |
|---|---|
| $T_{r,0}: U_i \rightarrow U_{(i+1) \bmod n}$ | |
| 100 | Transaction-ID |
| Version Number | Version number |
| <#> | Number of inputs |
| 100 | Prev Trans ID |
| 0 | Prev Trans Output index |
| Script length | Script length |
| OP_0 <sig $U_i$> <sig $U_{i+1}$> OP_TRUE <$T_c$ redeemScript> | ScriptSig |
| <ScriptSignatureFlags> | ScriptSig |
| Sequence number | Sequence number |
| <#> | Number of Outputs |
| xBTC | Output value |
| Output Script Length | Output script length |
| OP_DUP OP_HASH160 < H(pubkey $U_i$) > OP_EQUALVERIFY OP_CHECKSIG | Output script |
| $S + (n - i)s$ | LockTime |

| $T_{Pay}: U_i \rightarrow U_{(i+1) \bmod n}$ | |
|---|---|
| <ID> | Transaction ID |
| Version Number | Version number |
| <#> | Number of inputs |
| 100 | Prev Trans ID |
| 0 | Prev Trans Output index |
| Script length | Script length |
| <sig $U_{i+1}$> <$sv_{i+1}$> <$T_c$ redeemScript> | ScriptSig |
| <ScriptSignatureFlags> | ScriptSig |
| Sequence number | Sequence number |
| <#> | Number of Outputs |
| $x$ Units | Output value |
| Output Script Length | Output script length |
| OP_DUP OP_HASH160 < $H$(pubkey $U_{i+1}$) > OP_EQUALVERIFY OP_CHECKSIG | Output script |
| LockTime | LockTime |

SYSTEM AND METHOD FOR TRANSFERRING RESOURCES USING A BLOCKCHAIN

The present application relates generally to blockchains and blockchain networks and more particularly to the use of blockchain transactions for transfer of control of a resource, and even more particularly to cryptographically-enforced methods and systems for providing improved security, confidentiality and efficiency in blockchain-implemented transfers. The invention is particularly suited, but not limited, to use with any variation of the Bitcoin blockchain.

In this document the term 'blockchain' is used to include all forms of electronic, computer-based, distributed ledgers. These include consensus-based blockchain and transaction-chain technologies, permissioned and un-permissioned ledgers, shared ledgers and variations thereof. The most widely known application of blockchain technology is the Bitcoin ledger, although other blockchain implementations have been proposed and developed. While Bitcoin may be referred to herein for the purpose of convenience and illustration only, it should be noted that the subject matter of the present application is not limited to use with the Bitcoin blockchain and alternative blockchain implementations and protocols fall within the scope of the present application. The term "Bitcoin" as used herein includes any and all variations which derive from the Bitcoin protocol.

A blockchain is a peer-to-peer, electronic ledger which is implemented as a computer-based decentralised system made up of blocks which in turn are made up of transactions. Each transaction is a data structure that encodes the transfer of control of a digital asset between addresses in the blockchain system, and includes at least one input and at least one output. Each block contains a hash of the previous block to that blocks become chained together to create a permanent, unalterable record of all transactions which have been written to the blockchain since its inception.

Blockchains can be employed in a wide variety of applications. For example, a blockchain may be employed in providing a ledger reflecting ownership of one or more commodities. For example, in the Bitcoin blockchain the ledger reflects ownership of Bitcoins and fractions thereof. Some such commodities may represent an underlying unit such as for example, units of computing resources. A blockchain-based ledger reflecting ownership may allow commodities to be transferred between parties pseudo-anonymously, with the transactions on the blockchain not including personally-identifying information of either party.

In particular, the outputs of a given transaction may be sent to addresses, the addresses corresponding to public keys of particular parties. Those outputs may then be used by associated parties as inputs to further transactions, unlocked by the counterpart private key of the public key corresponding to the address.

Blockchains which provide an open, public ledger make available to any interested parties the ability to trace the movement of specific digital coins, digital assets, or control of digital resources across a sequence of addresses. For example, Bitcoin's effectiveness and success as a currency is tied to the real and perceived fungibility of bitcoins, fungibility being the interchangeability property of a unit of a good with other unit goods of the same type (http://www.investopedia.com/terms/f/fungibility.asp). While the ledger being open and distributed is useful in acting as a means to trust the system, the ability it gives for tracking transactions across addresses allows for digital assets tokens and resources related to specific historical transactions to be analysed and correlated. This could give rise to targeted attacks. To address Bitcoin fungibility, security and anonymization solutions have been developed. This can be useful as many real-world commercial transactions are confidential in nature, either for legal reasons, commercial reasons, or both. Accordingly, blockchain systems must be capable of ensuring both security and confidentiality for such transfers made over the network despite the public nature of the blockchain.

Research in Bitcoin anonymity has included the development of alt-coins such as ZeroCash (Ben-Sasson, E., et al. (2014), "Zerocash: Decentralized Anonymous Payments from . . . ", http://zerocash-project.org/media/pdf/zerocash-oakland2014.pdf) and Monero (Mackenzie, A., Noether, S., et al. (2015), "Improving Obfuscation in . . . " https://lab.getmonero.org/pubs/MRL-0004.pdf"). Likewise, Bitcoin-compatible solutions have been developed. Of these compatible solutions, coin mixing and associated variations are the most common, however other anonymization techniques exist, such as TumbleBit (Heilman, E., Alshenibr, L., Baldimtsi, F., Scafuro, A. and Goldberg, S., 2016. TumbleBit: An untrusted Bitcoin-compatible anonymous payment hub. Cryptology ePrint Archive, Report 2016/575; https://eprint.iacr.org/2016/575.pdf) and the use of Stealth Addresses (Franco, P., (2014), "Understanding Bitcoin: Cryptography . . . " http://eu.wiley.com/WileyCDA/WileyTitle/productCd-1119019168.html). What all these solutions have in common are measures to disassociate users from specific Bitcoin transactions and addresses (where the user is either payer or where the user is the payee).

In the case of coin mixing solutions, the user inputs Bitcoins into a service and their Bitcoins are transferred to an output address of the user's choosing. The assets having been pooled before they are sent to the output addresses makes it difficult to ascertain which of the output addresses belongs to the user.

Blockchain transaction mixing approaches suffer from several technical and security-related problems. Such transaction mixing approaches require a mixing service provider. This introduces an additional resource requirement into the system and additional management overhead for provision of this centralized transaction mixing service provider. Furthermore, the provision of a central transaction mixing service provider dilutes or compromises the decentralized, peer-to-peer architecture of a blockchain system. Such a centralized system removes control from the users. Furthermore, such a centralized system provides a focal point in the system for attack. Further still, the transaction mixing service provider may steal a user's digital assets from the pool or reveal to external parties the links between input addresses and output addresses, either intentionally or unintentionally, thus reducing security and confidentiality. In many ways, the provision of a centralized transaction mixing service provider compromises the fundamental ethos of a decentralized, peer-to-peer blockchain system which is intended to negate the requirement for centralized bodies.

In light of the above, one technical problem to be solved may be how to provide a solution which enables blockchain transaction mixing to be achieved in a way which is more decentralized, secure, resource efficient and confidential than existing solutions and which is controlled by users of the system rather than managed by a third party transaction mixing service provider in the manner of existing systems described in the background section.

The Applicant previously addressed one or more of the aforementioned problems with mixing approaches by way of two protocols, referred to as the Group Random Exchange (GRE) protocol and the Group Random Exchange Changing Secret (GRECS) protocol. By way of overview, GRE builds on the concept of a group agreeing for each member of a group of nodes to transfer x units of computing resources to one other member such that everyone gets paid. The GRE protocol makes use of a secret value k that is revealed only when a node chosen as an initiator submits to the blockchain a transaction in favour of an address associated with that node. One aspect of the GRE protocol is that the value k being common to payment channels established between nodes participating in the protocol may allow a third party to associate those transactions. GRECS is a variation of the GRE protocol with modifications so as to provide identical function while using a different secret value for each payment channel. In particular, each node participating in the protocol sends a respective secret value to an initiator node which then uses these values to initiate the transfers.

By way of GRE and its variant GRECS, a plurality of nodes is enabled to construct a transaction channel enabling exchange of resources with increased security and confidentiality. The transaction mixing system is distinct in forming and executing a blockchain transaction chain with at least one of the nodes being randomly chosen from the plurality of nodes in the chain. The chain is set up using commitment transactions. Such a system for exchanging digital assets between a plurality of nodes is more secure and does not require additional system overheads when compared to the prior art configurations described above. For example, the system does not require a mixing service provider which would otherwise introduce an additional resource requirement into the system and additional management overhead for provision of this centralized transaction mixing service provider. Furthermore, the provision of a central transaction mixing service provider dilutes or compromises the decentralized, peer-to-peer architecture of a blockchain system. Such a centralized system removes control from the nodes. Furthermore, such a centralized system provides a focal point in the system for attack. Further still, the transaction mixing service provider may steal a user's digital assets from the pool or reveal to external parties the links between input addresses and output addresses, either intentionally or unintentionally, thus reducing security. In contrast, in GRE and GRECS preparing and executing the transactions via a chain of commitment transactions is performed by the nodes rather than a third party. That is, those systems utilize a protocol that is not implemented/controlled by a third party.

One technical effect of GRE and GRECS results in a computer system which is made to operate in a new way. Furthermore, that computer system is a better computer system in the sense of running more efficiently and effectively to the extent that the system is more robust to hacking and data manipulation.

As noted above, in GRECS, secret values must be disclosed to an initiator before the transfers are initiated. In some scenarios such disclosure may be undesirable for security and/or efficiency reasons. For example, such concerns may arise in scenarios where GRECS is used as a building block for other, potentially more sophisticated, functionality.

Thus, it is desirable to provide a solution which does not require any participating nodes to communicate their respective secret value k to anyone else in the protocol prior to initiation of a transfer in favour of that node. Additionally or alternatively, it may be desirable that participating nodes only have to reveal their respective secret value k within a transaction that is in favour of an address associated with that node.

An improved solution has been devised having one or more of these desirable properties while still solving the technical problem(s) addressed by GRE and GRECS and offering similar desirable properties and technical effect.

The present application provides method(s) and system(s) as defined in the appended claims.

The present application describes a computer-implemented method. The method may include sending a public key associated with a particular node in a cyclically-ordered set of nodes participating in a blockchain network to an initiator node of the cyclically-ordered set; receiving, by the particular node from a node immediately previous to the particular node in the cyclically-ordered set, a first value based on public keys associated with each node in the cyclically-ordered set from the particular node through to the initiator node; determining, by the particular node, a locking value based on the first value and the public key associated with the particular node; and preparing, by the particular node, using the locking value, a transaction arranged to transmit control of a resource from a source address associated with the particular node to a receiving address of a node immediately subsequent to the particular node in the cyclically-ordered set. The control of the resource is to be transmitted responsive to satisfaction of an execution condition including supply of an unlocking value corresponding to the locking value.

The resource may be, for example, a tokenised asset or entity, or a portion of cryptocurrency or any item transferred via the blockchain.

In some implementations, the unlocking value is based on private keys corresponding to the public keys associated with each node in the cyclically-ordered set from the immediately subsequent node through to the initiator node.

In some implementations, the first value is a sum of the public keys associated with each node in the cyclically-ordered set from the particular node through to the initiator node.

In some implementations, determining the locking value includes subtracting the public key associated with the particular node from the first value.

In some implementations, the method further includes sending, by the particular node to the immediately subsequent node, a second value based on the first value and the public key associated with the particular node. The second value may be a sum of the public keys associated with each node in the cyclically-ordered set from the immediately subsequent node through to the initiator node and may be determined by subtracting the public key associated with the particular node from the first value.

In some implementations, another transaction is arranged to return control of the resource to the particular node upon satisfaction of a return condition.

In some implementations, the method further includes obtaining a third value based on private keys corresponding to the public keys associated with each node in the cyclically-ordered set from the immediately subsequent node through to the initiator node; determining, by the particular node, a second unlocking value based on the third value and a private key corresponding to the public key associated with the particular node; executing a second transaction prepared by the immediately previous node and arranged to transmit control of a second resource from a source address associated with the immediately previous node to a receiving address of the particular node, wherein control of the second resource is to be transmitted responsive to satisfaction of an execution condition including supply of the second unlocking value.

In some implementations, the third value is received from the immediately subsequent node.

In some implementations, the third value is extracted from a transaction submitted to a blockchain of the blockchain network.

In some implementations, the third value is a sum of the private keys corresponding to the public keys associated with each node in the cyclically-ordered set from the immediately subsequent node through to the initiator node.

In some implementations, determining the second unlocking value includes adding the private key corresponding to the public key associated with the particular node to the third value.

In some implementations, the aforementioned-method may further include sending the second unlocking value to the immediately previous node.

In some implementations, each public key and its corresponding private key form an elliptical curve cryptography public-private key pair.

In some implementations, the method further includes submitting the second transaction to a blockchain of the blockchain network.

In some implementations, the resource and the second resource are identical or substantially identical or similar. They may be similar in the sense that they share certain properties or attributes.

The present application further describes a computing device adapted to serve as a particular node in a cyclically-ordered set. The computing device includes a processor; a memory; a network interface; and a non-transitory computer-readable storage medium storing computer-executable instructions that, when executed by the processor, cause the computing device to perform the aforementioned method.

The present application further describes a non-transitory computer-readable storage medium storing instructions that adapt a computer system to serve as a particular node in a cyclically-ordered set wherein the instructions, when executed by a processor of the computer system, cause the computer system to perform the aforementioned method.

Any feature described in relation to one aspect or embodiment of the invention may also be used in respect of one or more other aspects/embodiments. These and other aspects of the present invention will be apparent from and elucidated with reference to, the embodiment described herein. An embodiment of the present invention will now be described, by way of example only, and with reference to the accompanying drawings, in which:

FIG. 8 illustrates an example commitment transaction according to the present application;

FIG. 9 illustrates an example refund transaction according to the present application;

FIG. 10 illustrates an example payment transaction according to the present application;

Like reference numerals are used in the drawings to denote like elements and features.

Figure 1:
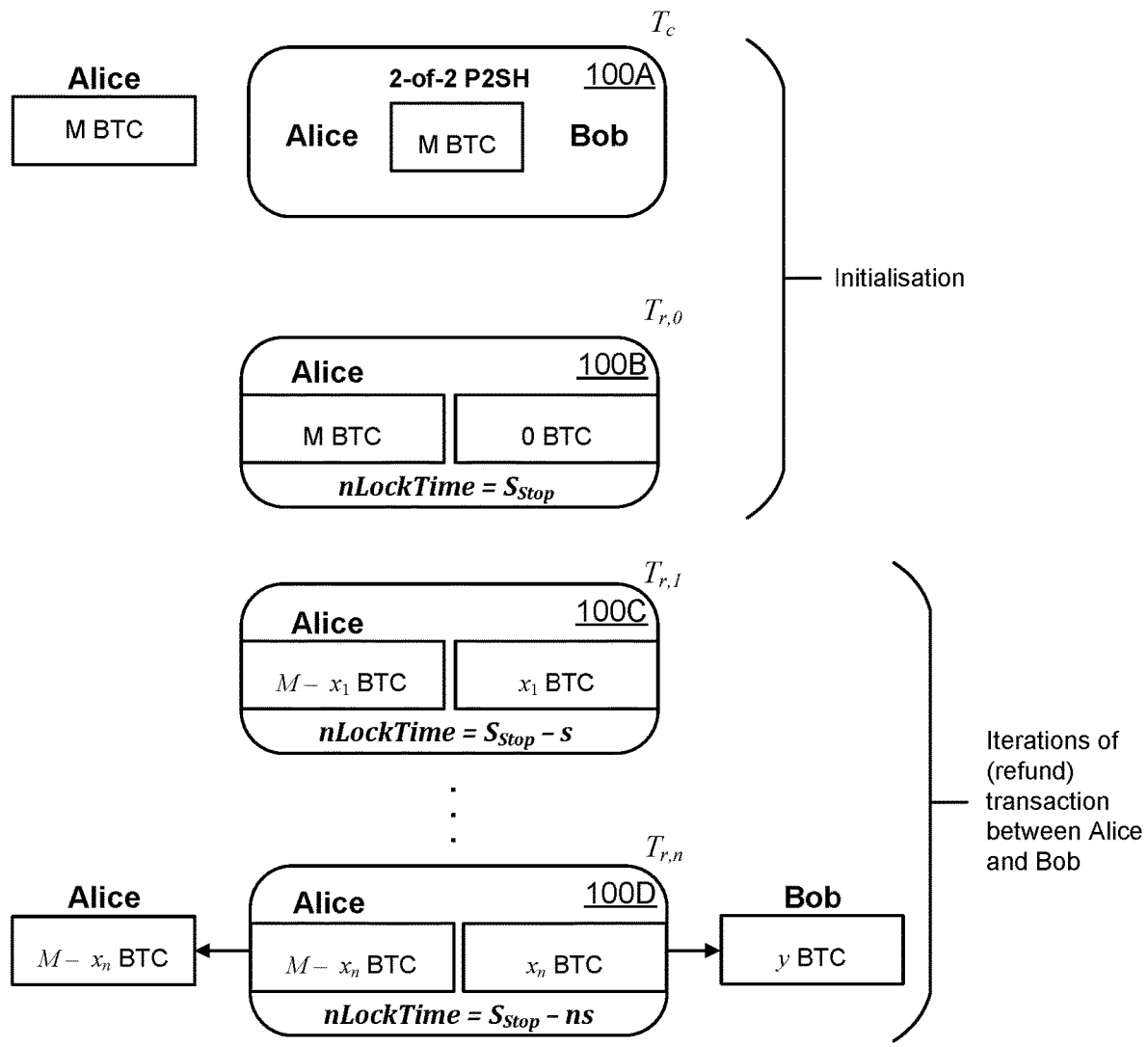
FIG. 1 shows the transactions used in a payment channel.

In the present application, the term "and/or" is intended to cover all possible combinations and sub-combinations of the listed elements, including any one of the listed elements alone, any sub-combination, or all of the elements, and without necessarily excluding additional elements.

In the present application, the phrase "at least one of . . . or . . . " is intended to cover any one or more of the listed elements, including any one of the listed elements alone, any sub-combination, or all of the elements, without necessarily excluding any additional elements, and without necessarily requiring all of the elements.

A protocol, named the Group Random Exchange Late Reveal (GRELR) protocol, embodying the present invention, is described herein for a node to move units representing a quantity of computing resources from one address to another while obscuring the link between a particular node's addresses and while reducing or limiting the possibility of a that node having its resources misappropriated. It is built on the concept of a group agreeing for each node of the group to transfer units of a computing resource to an address associated with another node of the group such that everyone receives the output of a transfer.

The node associated with the address to which a particular node transfers x units is selected randomly from amongst the nodes of the group and likewise the node that transfers x units of computing resources to an address associated with the particular node is also selected randomly from amongst the nodes of the group. By doing this the particular node may transfer x units of computing resources to one address but accept receipt of x units of computing resources at a different address from a different node which is randomly determined. Put differently, it may be that, as an amount, the resource transmitted to each node is identical except for the address from which it originates. The randomizing of nodes may, however, make it difficult for parties external to the protocol to analyse the blockchain and determine a link between the particular node's input and output addresses. Thus, security can be increased.

Moreover, the GRELR protocol is able to accomplish this exchange between a group of n users where no user within the group risks losing units. The protocol uses refund transactions, where applicable, to allow a user to reclaim their respective units if anything does not go as planned in the execution of the protocol.

The GRE Protocol builds on two existing Bitcoin-related technologies. The first of these is Payment Channels ('Introduction to Micropayment Channels' http://super3.org/introduction-to-micropayment-channels/), which is a technique designed for off-block Bitcoin transactions between a pair of users and notably incorporates the usage of refund transactions. The second of these technologies is Atomic Cross-Chain Trading (ACCT) ('Atomic cross-chain trading', https://en.Bitcoin.it/wiki/Atomic_cross-chain_trading), which is a protocol designed for a user with x coins in one cryptocurrency to exchange them for another user's y coins in another cryptocurrency. This is done as a "fair exchange", such that a first user cannot acquire a second user's coins without giving the second user the ability to collect the coins they are owed by the first user.

The GRELR protocol is an improvement to the GRE protocol and, more particularly, on the GRECS protocol. GRELR improves by avoiding the need to use a common secret. It also improves by avoiding the need to prematurely reveal the particular secret associated with each node, such that participants only reveal a secret result based in part on the particular secret associated with that node when they collect their respective payments. GRELR accomplishes this by reversing the direction, as compared to GRECS, in which secret values are consolidated to form the secret results. In doing so, GRELR may avoid participating nodes having to reveal their secret value other than within the execution of a transaction in favour of an address associated with that node.

While improving on GRECS, GRELR also satisfies various conditions satisfied by GRECS including:

1. The secret values for payment channels should be difficult to guess.

2. The revelation of a secret result in executing the payment transaction of a particular payment channel should allow the secret result necessary to unlock the next payment channel in GRE sequence (anticlockwise) to be revealed or at least be easily calculable.

3. It should be difficult for external observers to identify a relationship between secret keys (or secret key encryptions).

4. The protocol should be designed prevent or limit risk of losses of assets tracked by the blockchain to participants in the exchange due only to operation of the protocol.

Payment Channels

As mentioned above, payment channels feature in the present invention. An overview of payment channels follows.

Payment channels are techniques designed for users to make multiple Bitcoin transactions without committing all of the transactions to the blockchain. In a typical payment channel implementation, a nearly unlimited amount of payments can be made but it is only ever necessary to add two transactions to the blockchain.

In addition to the reduced number of transactions being added to the blockchain and the associated reduced costs, payment channels also offer the advantage of speed and, importantly, the ability of the users to have units refunded if the things do not go as planned or either user decides not to proceed beyond a certain set of payments. A description of a payment channel implementation is outlined below.

Consider the scenario where Alice needs to pay Bob for a service. This may require multiple payments from Alice to Bob over a period of time as the situation demands. Alice expects to spend at most 15 Bitcoin (in total) to Bob in the possible set of exchanges. To facilitate this, a payment channel is established between Alice and Bob and operates as follows.

First, Alice creates a 2-of-2 multisignature pay to script hash (P2SH) transaction, $T_c$, governed by both Alice and Bob that commits 15 Bitcoin originating from Alice. At this point the transaction is not submitted to the Bitcoin network (such a multisignature address requires that 2 individuals (Alice and Bob) sign any transaction that spends money from this address);

Next, Alice creates a separate refund transaction, $T_{r,0}$, returning all units of the 'multisignature controlled funds' to Alice. This transaction includes an nLockTime value of 100 blocks (nLockTime is a Bitcoin transaction parameter that allows a Bitcoin transaction to only be executable after a specified time has passed). Bob signs the transaction. This refund transaction allows Alice to be refunded, after nLockTime has transpired, if the exchange between Alice and Bob goes awry;

Next, Alice signs the original transaction $T_c$.

At this point Alice and Bob may proceed to create new refund transactions to reflect the (off the blockchain) transfers being made from Alice to Bob. These refund transactions would reflect the net amount that Alice is required to transfer to Bob at that point in time. As an example, if Alice is to transfer Bob 5 Bitcoin, a new refund transaction, $T_{r,i}$, is created that has an output sending 5BTC to Bob and 10BTC back to Alice. If Alice needs to transfer another 5 Bitcoin to Bob then the new refund transaction, $T_{r,i+1}$, is created with outputs sending 10 Bitcoin to Bob and 5 Bitcoin to Alice. For each new refund transaction, assuming they are in agreement with the details, both parties sign the transaction but do not necessarily submit the transaction to the network.

Note that each successive refund transaction created has a lower nLockTime than that of the previous refund transaction—i.e., nLockTime($T_{r,i+1}$)<nLockTime($T_{r,i}$).

If a user refuses to sign any $T_{r,i}$ then an aggrieved user may simply submit the $T_{r,i-1}$. In the worst-case scenario Alice signs $T_{r,0}$ and submits it to the network reclaiming all her units (after nLockTime has expired).

The final refund transaction constructed represents the net sum of the units being transferred from Alice to Bob. This transaction is submitted to the network.

FIG. 1 shows the transactions $T_c$ 100A, and $T_{r,n}$ 100D used in a payment channel. M represents the maximum amount of money that may be sent from Alice to Bob. $x_i$ is the current net sum of the units Alice needs to pay to Bob. $S_{stop}$ is the nLockTime on the initial refund transaction. n is the number of refund transactions created in the ongoing (off-block) transfers made between Alice and Bob (this excludes the initial refund transaction). s is the time allotted for both users to agree to a refund transaction before a party risks the other party submitting the previous refund transaction, effectively ending the exchanges between Alice and Bob.

Note that: $t+n*s<S_{stop}$, where t is the current time, and $(S_{stop}-n*s) \geq s$.

Transactions $T_c$ 100A, $T_{r,0}$ 100B, $T_{r,1}$ 100C, and $T_{r,n}$ 100D of FIG. 1 are transactions that may appear on the blockchain.

Figure 2:
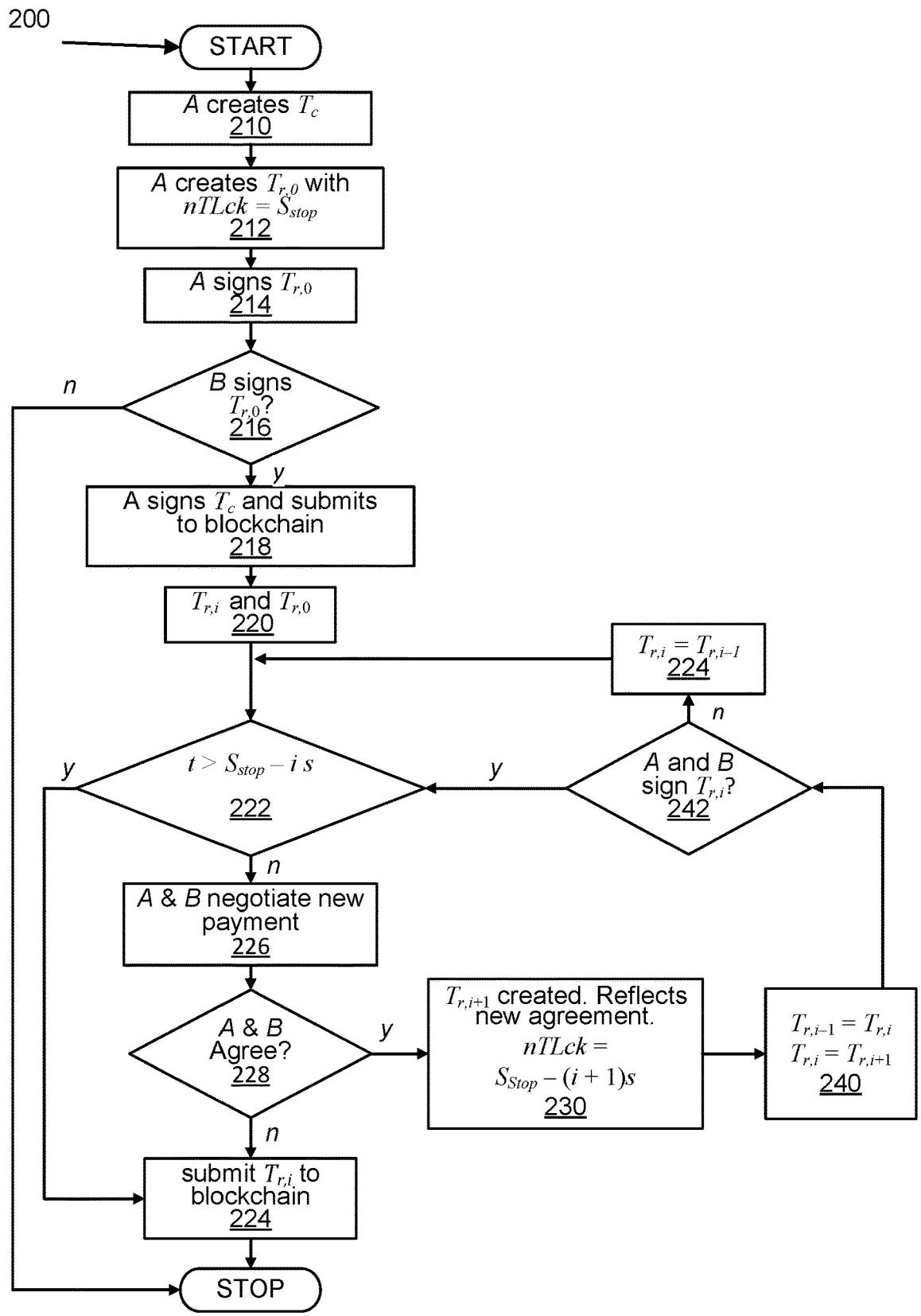
FIG. 2 is a flowchart illustrating how a payment channel in accordance with FIG. 1 may be created.

Operations for constructing the payment channel between Alice and Bob are shown to a flowchart 200 of FIG. 2. Operations 210 and onward are performed by one or more processors of one or more computing devices executing software comprising computer-executable instructions as may be stored on a computer-readable storage medium.

At the operation 210, a processor of a computing device associated with Alice creates a 2-of-2 multisignature pay to script hash (P2SH) transaction, $T_c$, in manners described above.

From the operation 210, control flow proceeds to an operation 212. At the operation 212, a processor of a computing device associated with Alice creates a separate refund transaction, $T_{r,0}$, returning all units of the 'multisignature controlled funds' to an account associated with Alice in manners described above.

From the operation 212, control flow proceeds to an operation 214. At the operation 214, a processor of a computing device associated with Alice signs the above-described refund transaction.

From the operation 214, control flow proceeds to an operation 216. At the operation 214, a processor of a computing device associated with Bob may also sign the above-described refund transaction. If the transaction is so signed, control flow advances to an operation 218. Alternatively, if the transaction is not so signed, creation of the payment channel is aborted.

At the operation 218, a processor of a computing device associated with Alice signs $T_c$ and submits it to the blockchain. Control flow then advances to an operation 220.

At the operation 220, the above-mentioned refund transaction is recognized as a first refund transaction so that a further transfer from Alice to Bob can be negotiated if time allows.

From the operation 220, control flow advanced to an operation 222. At the operation 222, it is determined with sufficient time remains to negotiate the further transfer. If there is not sufficient time remaining, control flow advances to an operation 224 where the last refund transaction is submitted to the blockchain. Alternatively, if sufficient time remains, control flow advances to an operation 226.

At the operation 226, a further transfer between Alice and Bob is negotiated. from the operation 226, control flow advances to an operation 228 where it is determined if the negotiation was successful. If that negotiation was unsuccessful, control proceeds to the operation 224 described above. Alternatively, a successful negotiation will result in control flow advancing to an operation 230.

At the operation 230, a new refund transaction reflective of the agreement stemming from the successful negotiation is created in manner described above. Then, control flow advances to an operation 240 where the new refund transaction is recognized as the current refund transaction.

From the operation 240, control flow advances to an operation 242 where processors of computing devices associated with Alice and Bob may sign the current refund transaction. If so, control flow returns to the operation 222 described above. Alternatively, if the transaction is not so signed, then recognition of the current refund transaction reverts to the pervious refund transaction at an operation 244. From the operation 244, control flow returns to the operation 222 described above.

Figure 3:
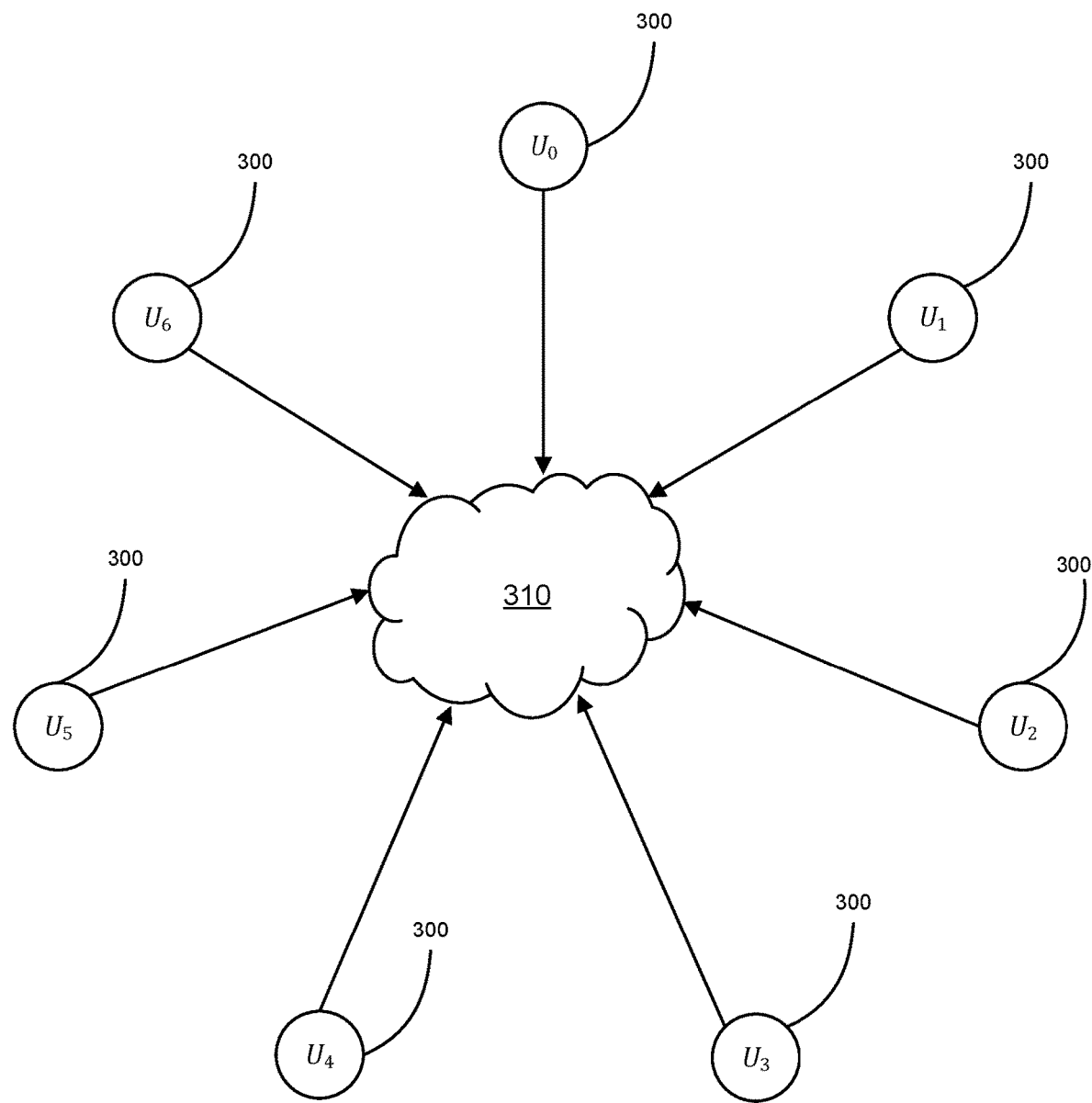
FIG. 3 is a simplified schematic diagram illustrating an example operating environment of the present application.

FIG. 3 shows an example operating environment of the present application.

As illustrated, a plurality of nodes 300 are in communication via a computer network 310. Each of the nodes 300 is a computing device and participating in a blockchain and has one or more associated addresses in associated with which the blockchain reflects a quantity of units such as, for example, units of computing resources.

As further described below, each of the nodes 300 may transfer a quantity, x units, from an address associated with the node to an address associated with another of the nodes 300. Conveniently, in this way, transactions on the blockchain may be mixed so as to obscure ownership relationships between input and output addresses of the various transfer transactions.

Figure 4:
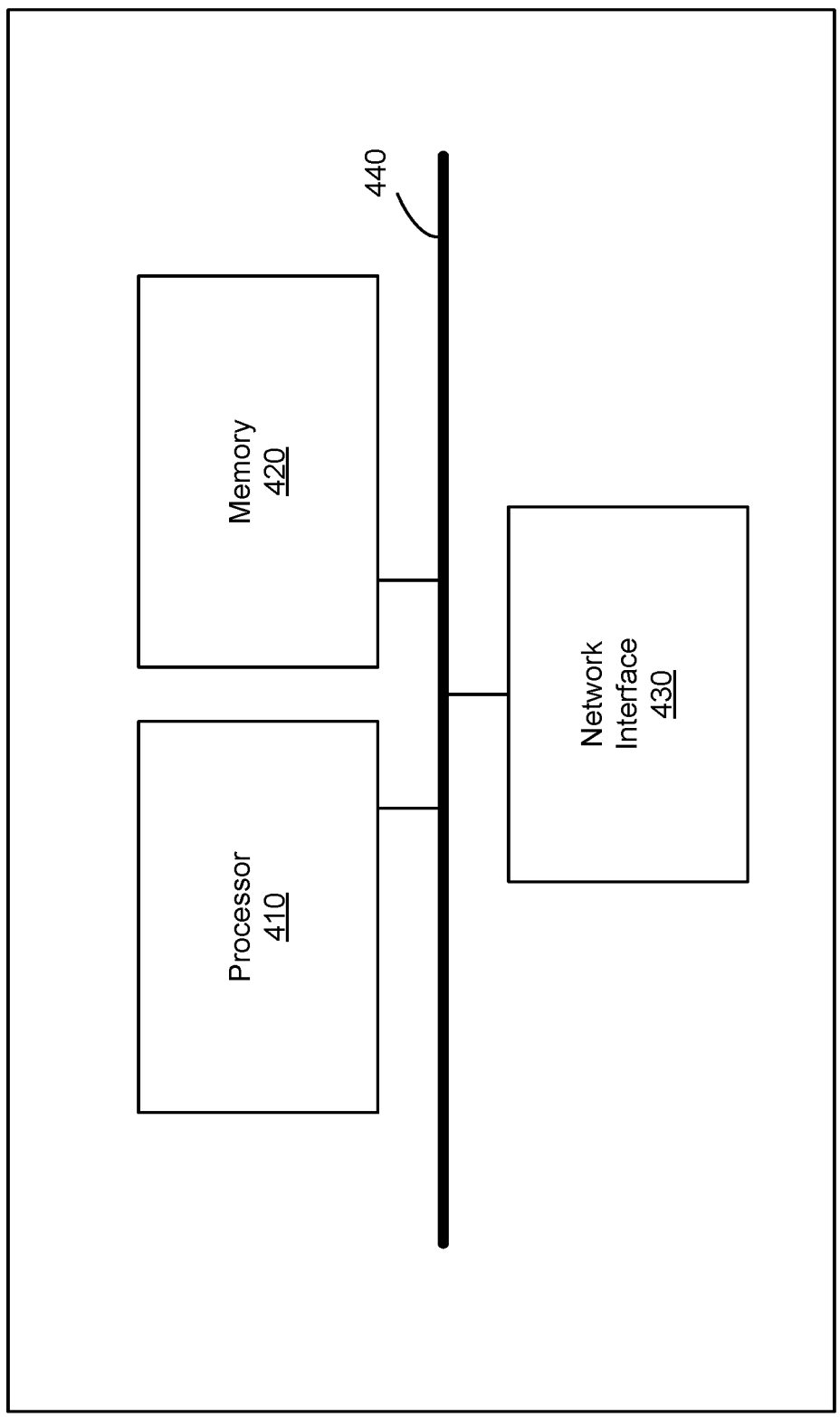
FIG. 4 illustrates an example computing device.

FIG. 4 is a high-level operation diagram of an example computing device. Example computing device 400 may be exemplary of one or more of the computer systems described herein including, for example, one or more of the nodes 300. The example computing device 400 includes software that adapts it to perform a particular function.

The example computing device 400 includes a variety of modules. For example, as illustrated, the example computing device 400 may include a processor 410, a memory 420, and a network interface 430. As illustrated, the foregoing components of the example computing device 400 are in communication over a bus 440.

The processor 410 is a hardware processor. The processor 410 may, for example, be one or more ARM. Intel x86, PowerPC processors or the like.

The memory 420 allows data to be stored and retrieved. The memory 420 may include, for example, random access memory, read-only memory, and persistent storage. Persistent storage may be, for example, flash memory, a solid-state drive or the like. Read-only memory and persistent storage are a non-transitory computer-readable storage medium. A computer-readable medium may be organized using a file system such as may be administered by an operating system governing overall operation of the example computing device 400.

The network interface 430 allows the example computing device 400 to communicate with other computing devices and/or various communications networks such as, for example, the computer network 310 (FIG. 3).

Software comprising instructions is executed by the processor 410 from a computer-readable medium. For example, software may be loaded into random-access memory from persistent storage of the memory 420. Additionally or alternatively, instructions may be executed by the processor 410 directly from read-only memory of the memory 420.

As further described below, software may adapt instances of the example computing device 400 to serve as one or more of the various computer systems mentioned herein, including, for example, one or more of the nodes 300.

Figure 5:
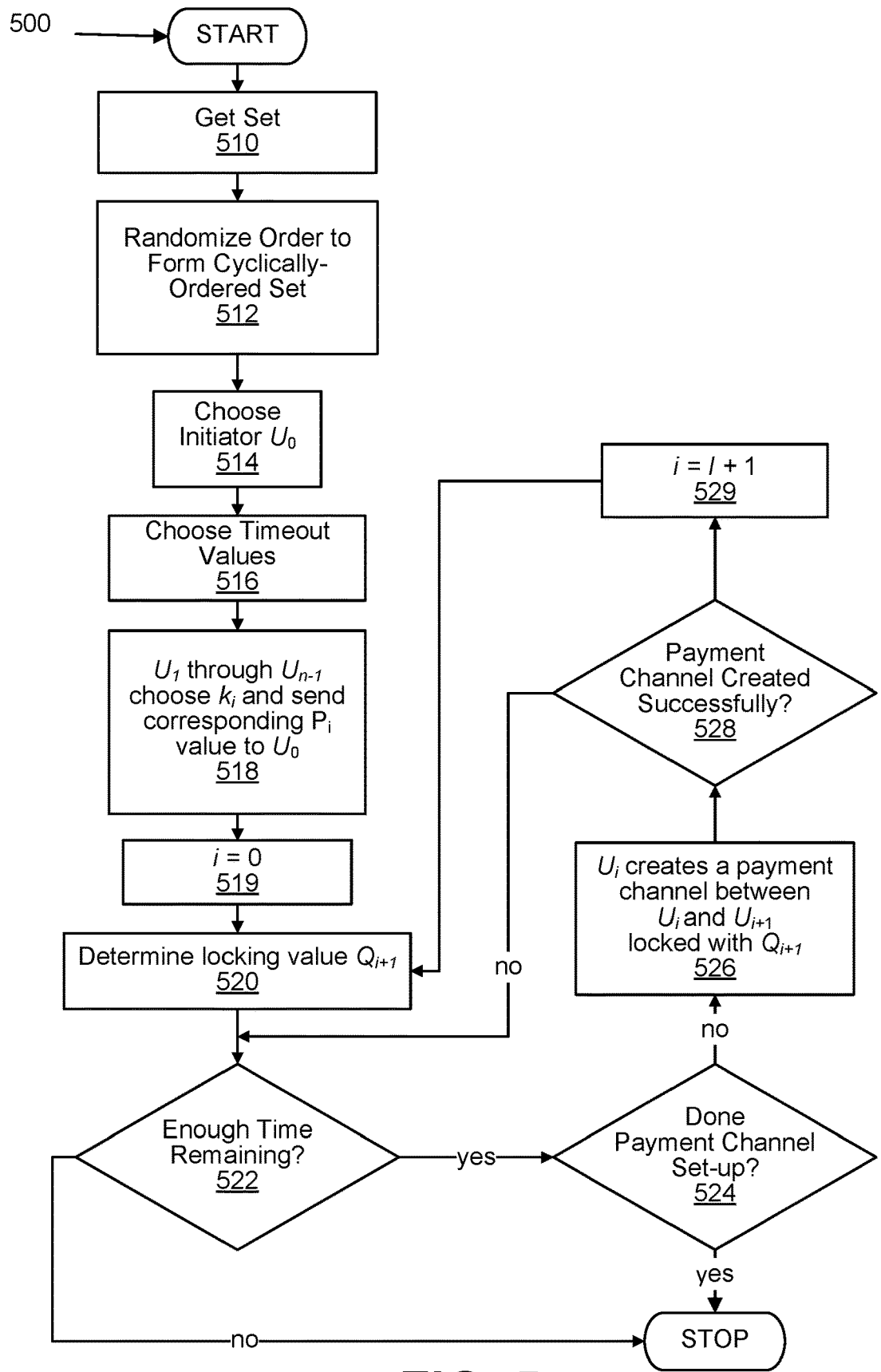
FIG. 5 is a flowchart illustrating operations performed by nodes of FIG. 3.

Operations performed by nodes 300 acting in cooperation are described with reference to a flowchart 500 of FIG. 5. Operations 510 and onward are performed by one or more processors of various of the nodes 300. As such, operations 510 and onward are performed by one or more processors of computing devices, such as, for example, the processor 410 (FIG. 4) of suitably configured instances of the example computing device 400 executing software comprising computer-executable instructions as may be stored on a computer-readable storage medium such as for, example, storage of the memory 420.

At the operation 510, a set consisting of the nodes 300 is identified. For example, it may be that nodes 300 all register with an authority (such as, for example, another node or a particular one of the nodes 300).

Figure 6:
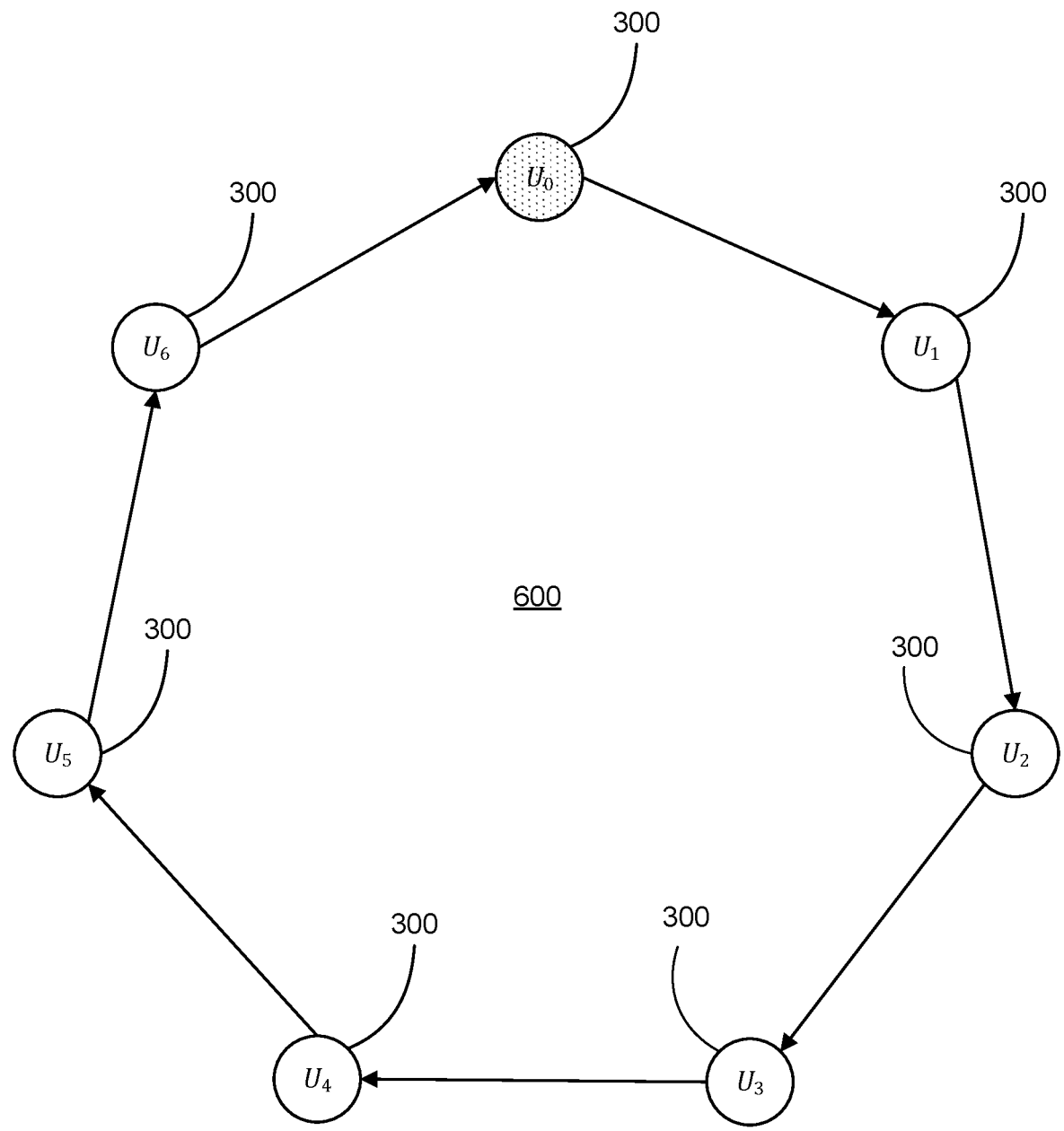
FIG. 6 is a diagram illustrating a cyclically-ordered set constructed of nodes of FIG. 3.

Next, at the operation 512, the set consisting of the nodes 300 is randomized to realize a cyclically-ordered set of the nodes 300 as depicted in FIG. 6.

As shown in FIG. 6, the cyclically-ordered set may be considered as a ring 600, with each of the nodes 300 having two other ones of the nodes as an immediately successive node and an immediately previous node to that node.

Each of the nodes 300 in the ring 600 may, as shown, be assigned a label $U_i$ for $0 \leq i < n$, where n is the number of nodes. Conveniently then, the immediately previous node to a node $U_i$ is the node $U_{(i-1) \bmod n}$ and the immediately successive node to a node $U_i$ is the node $U_{(i+1) \bmod n}$.

Returning to FIG. 5, following the operation 512, at an operation 514, one of the nodes 300 is selected to as an initiator node. For example, it may be that each of the nodes 300 performs an operation or participates in a protocol resulting a particular one of the nodes being selected as the initiator node. Alternatively, one of the nodes 300 may be selected as the initiator by some central authority.

For the purposes of illustration, the following explanation assumes that the initiator node is $U_0$ and the terms initiator and the label $U_0$ are used synonymously, though this is merely by way of example and is by no means required.

The initiator chooses a private key $k_s$ which may, for example, be a suitable random number $k_s$. A corresponding public key of a private-public key pair may be generated as can be denoted $P_s$. The initiator maintains the value $k_s$.

It may be the elliptical curve cryptography is employed and $k_s$ and $P_s$ may be an elliptical curve cryptography public-private key pair such that $P_s=k_sG$ where G is a base point on an elliptical curve with order q. $q \times G = 0$, where q is a large prime number and $0 < k_s < q$. In a particular example, the elliptical curve secp256k1—defined in the document "Standards for Efficient Cryptography 2 (SEC 2)", Certicom Corp, Jan. 27, 2010—may be employed. When elliptical curve cryptography is employed, therefore, $P_s$ may be determined from $k_s$ using the relation $P_s=k_sG$.

Next, at an operation 516, various timeout values are selected as follows.

First, a time value s is chosen that represents the amount of time each user $U_i$ requires to complete certain operations which are further described below, namely constructing a payment channel $U_i \rightarrow U_{(i+1) \bmod n}$, receiving a secret value, and submitting an execution transaction $T_{pay}$ that transfers x units in favour of $U_{(i+1) \bmod n}$ to the blockchain. Any one of the nodes 300 may choose time s, given the consensus of the other users. In some implementations, the initiator may choose s which may simplify the protocol. Time s may be expressed in appropriate units such as, for example, seconds or number of blocks.

Second, a value, S, is chosen as the starting time of the first transfer to a user being submitted to the Bitcoin network. Any of the nodes 300 may choose S, given the consensus of the other nodes. In some implementations, the initiator chooses S which may simplify implementation of the protocol.

Notably, S represents a point in time such a may be specified, for example, in either Unix time or block height, whereas s represents a time span.

Next, at an operation 518, each of the nodes 300 other than the initiator—i.e., $U_1 \ldots U_{n-1}$—selects a corresponding secret random value $k_i$, a private key associated with $U_i$. Each of the nodes, $U_i$, then determines a corresponding public key $P_i$ and sends it to the initiator, $U_0$.

As noted above, elliptical curve cryptography may be employed and each $k_i$ and its corresponding $P_i$ may be an elliptical curve public-private key pair such that $P_i=k_iG$. In other words, each public key $P_i$ and its corresponding private key $k_i$ may form an elliptical-curve public-private key pair. If elliptical curve cryptography is employed, therefore, $P_i$ may be determined by nodes 300 from their respective $k_i$ using the relation $P_i=k_iG$.

As further described below, payment channels are next established between each of the nodes 300 and the immediately succeeding one of the nodes 300.

As depicted by an operation 519, processing occurs relative to each of the nodes according to a notional iterator value i which can be considered to be initialized to 0—i.e., payment channel creation begins at initiator $U_0$ as further described below.

At an operation 520, a locking value $Q_{i+1}$ is determined. The locking value may be based on the public keys associated with each of the nodes 300 in the cyclically ordered set from the node $U_i$ through to the initiator (i.e., going clockwise around ring 600 (FIG. 6).

$Q_{i+1}$ may be determined based on $P_s$ and $P_1 \ldots P_{n-1}$. For example, where elliptical key cryptography is being employed, $Q_{i+1}$ may be determined as the sum $P_i + \ldots + + P_{n-1} + P_s$. Notably in the case of the initiator, $U_0$, determining $Q_1$, is possible because of the receiving of the $P_i$ values at the operation 518. Further, each one of the nodes 300 after the initiator may, prior to creating a payment channel, may learn the value $Q_n$ from a node immediately previous to that node. Put differently, each one of the nodes 300 may communicate its respective $Q_{i+1}$ value to its successor in the cyclically-ordered set. Conveniently, these received values may be used by each of the nodes following the initiator to determine a respective $Q_{i+1}$. For example, in the case of where elliptical curve cryptography is employed $Q_{i+1}$ may be determined from $Q_n$ by subtracting the value $P_n$. Notably $P_n$ is known to each $U_n$ (where n>0) because it generated that value at the operation 518.

Next, at an operation 522, a check is made to ensure sufficient time is remaining to complete the necessary steps in GRELR protocol. In particular, the current time may be compared to the starting time of the first transfer, S, to ensure that sufficient time exists such that each of the payment channels not yet established can be allotted the determined time s for completion in series. In other words, the check may be to ensure $S-t>(n-i)s$, where t is the current time.

If the check at the operation 522 fails, GRELR is aborted. Otherwise, another check is made at an operation 524 to see if payment channel set-up is completed—i.e., where i is still less than the number of nodes, n.

If payment channel setup is done, processing at this stage stops so that the protocol may move on to further processing as described below. Otherwise, next, at an operation 526, a payment channel is established between nodes $U_i$ and $U_{i+1}$. As further described below, the value $Q_{i+1}$ will be employed to lock the payment transaction of the payment channel.

Figure 7:
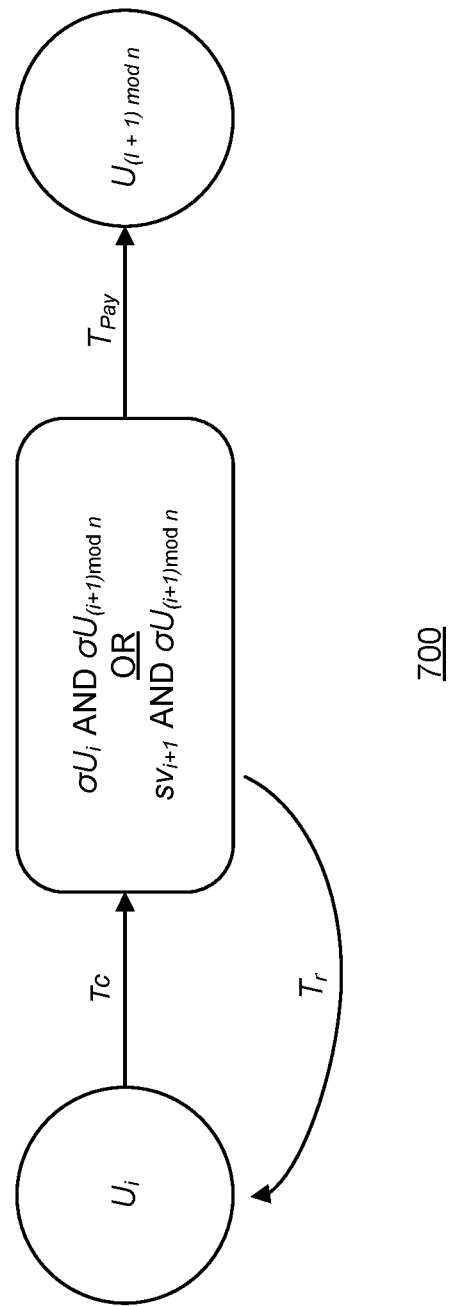
FIG. 7 is a diagram illustrating an example payment channel according to the present application.

FIG. 7 provides a representation 700 of a $U_i \rightarrow U_{(i+1) \bmod n}$ payment channel such as may be established at the operation 526.

As illustrated, the channel includes three transactions, $T_c$, $T_{pay}$, and $T_r$. Note that $\sigma U_i$ represents the signature of $U_i$.

The $T_c$ transaction represents the commitment component of the payment channel. Here, through the transaction, $U_i$ sends/commits a specified number of units to be governed by either: a 2-of-2 multisignature ($U_i$, $U_{i+1}$) or knowledge of a value $sv_{(i+1)}$ and the signature of $U_{(i+1)}$.

The $T_r$ transaction represents a refund of the specified number of units (from the commitment transaction) back to $U_i$ that becomes eligible for submission to the blockchain after a specified time has expired. As such, $T_r$ is arranged to return control of a resource to a particular node, $U_i$ upon satisfaction of the return condition of time expiry. For this transaction to be executed successfully it requires the signatures of $U_i$ and $U_{i+1}$.

The $T_{Pay}$ transaction is the transfer of the specified number of units from committed funds of $U_i$ to $U_{(i+1)}$. For this transaction to be executed successfully it requires the knowledge of a secret value $sv_{i+1}$ and the signature of the user $U_{i+1}$. As further described below, $sv_{i+1}$ is the counterpart to $Q_{i+1}$ and may, such as where elliptical curve cryptography is employed, represent a private key related to $Q_{i+1}$ viewed as a public key—i.e., such that $Q_{i+1}=sv_{i+1}G$.

Notably, because of the ring—i.e., cyclically-ordered—arrangement of the nodes 300, and the fact that the ordering of the nodes 300 in that ring was random means that the nodes transferring to and being transferred to by a particular one of the nodes 300, $U_i$, are both random. Furthermore, the nodes being transferred to and receiving a transfer from $U_i$ are different.

Where the blockchain is the Bitcoin blockchain, each of $T_c$, $T_r$ and $T_{pay}$ may be Bitcoin transactions.

FIG. 8 includes a table 800 showing details of an example $T_c$ Bitcoin transaction.

FIG. 9 includes a table 900 showing details of an example $T_r$ Bitcoin transaction.

FIG. 10 includes a table 1000 showing details of an example $T_{pay}$ Bitcoin transaction.

Notably, the details of the transactions shown in each of table 800, table 900 and table 1000 is limited to the <scriptSig>, <scriptPubkey>, nLockTime, and output values of the various transactions, as these are the transaction elements most relevant to the GRELR protocol.

Further, the transactions shown in each of table 800, table 900 and table 1000 assumes elliptical-key cryptography is being employed for GRELR. Notably, in transaction $T_C$ a non-standard opcode OP_ECPMULT is employed. OP_ECPMULT takes an encoded Elliptic Curve Point and a number and performs Elliptic Curve Multiplication by Scalar, outputting the result as an encoded Elliptic Curve Point.

Returning to FIG. 5, following the operation 526, flow advances to an operation 528 where a check is made to determine whether a payment channel was created successfully at the operation 526. If so, the counter i is incremented at an operation 529 and then the flow returns to the operation 520 to process the next node, if any. Alternatively, if there was a failure in payment channel creation at the operation 526, the check at the operation 528 will fail and GRELR will terminate.

Notably, for each of the nodes 300 other than the initiator node $U_0$, the payment channel in favour of that node is created in advance of the payment channel where that node acts as a provider of resources. This sequence allows each node $U_i$ to ensure that there is a $T_{pay}$ transaction in its favour that it would be able to execute if $U_{i+1}$ were to ever collect on the $T_{pay}$ from $U_i$ to $U_{i+1}$. Meanwhile, $U_0$ is safe without this guarantee because, unlike the other nodes, the initiator node $U_0$ cannot be "cheated" as it is the only node with knowledge of the value $k_s$ which is required to construct the unlocking value of each and every one of the payment channels. As such, no transaction $T_{pay}$ (including $T_{pay}$ from $U_0$ to $U_1$) may be executed unless and until $U_0$ discloses $k_s$.

Figure 11:
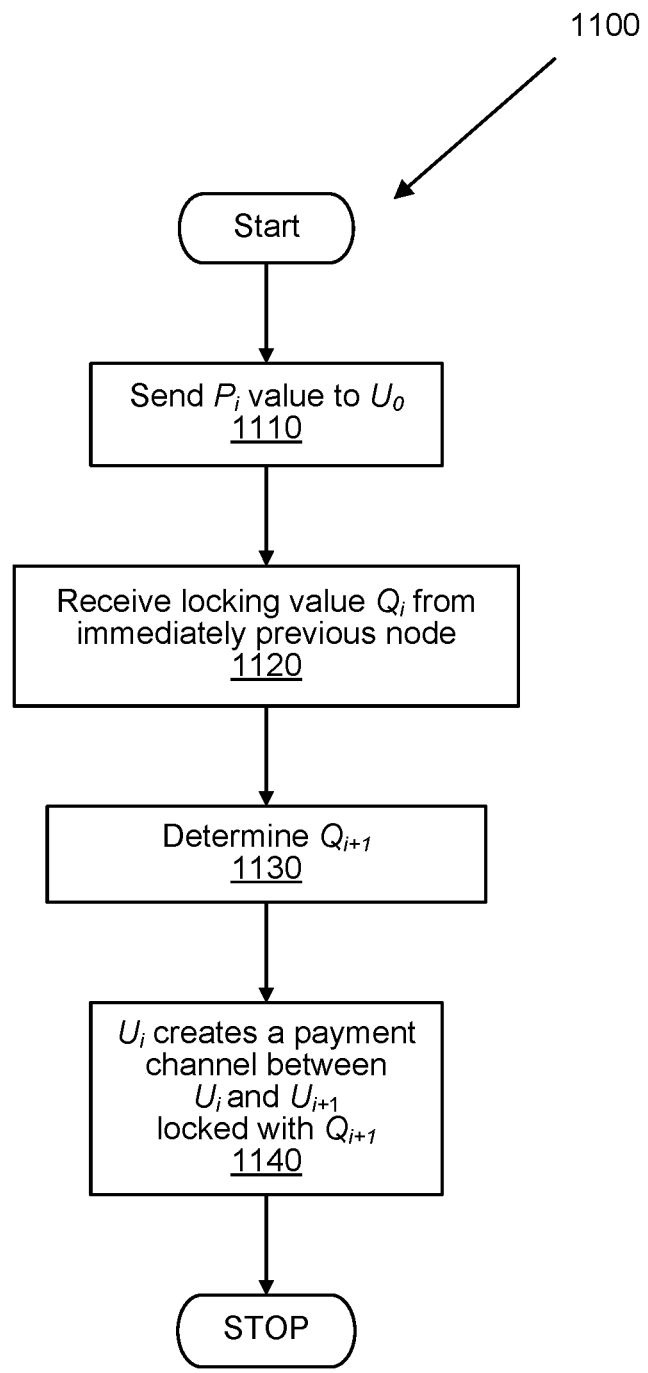
FIG. 11 is a flowchart illustrating operations performed by a particular node of FIG. 3.

FIG. 11 will now be discussed. FIG. 11 shows a flowchart 1100 illustrating operations performed by a particular node of FIG. 3 in carrying out operations in accordance with the flowchart 500 (FIG. 5). Operations 1110 and onward are performed by one or more processors of a particular, non-initiator one of the nodes 300. As such, operations 1110 and onward are performed by one or more processors of a computing device, such as, for example, the processor 410 (FIG. 4) of a suitably configured instance of the example computing device 400 executing software comprising computer-executable instructions as may be stored on a computer-readable storage medium such as for, example, storage of the memory 420.

The flowchart 1100 presumes that a cyclically-ordered set has been formed with the nodes 300 by randomizing the nodes as described above. Additionally, it is assumed particular node, $U_i$, has generated a secret value, $k_i$, a private key, and also a corresponding public key $P_i$. For example, the particular node may have generated $k_i$ and then determined $P_i$ using the relation $P_i=k_iG$ as discussed above if elliptical curve cryptography is being utilized in a particular implementation of GRELR.

At the operation 1110, the particular node sends a value $P_i$ corresponding to $k_i$ to the initiator node $U_0$. $P_i$, as discussed above, is a public key corresponding to $k_i$. As such, at the operation 1110, the particular node sends a public key associated with the particular node to the initiator node of the cyclically-ordered set.

From the operation 1110, control flow proceeds to an operation 1120. At the operation 1120, a first value, $Q_i$, is received from the immediately previous node—i.e., $U_{i-1}$. As discussed above the received value is based on public keys associated with each node in the cyclically-ordered set from the particular node through to the initiator node—i.e., $U_0$ through to $U_i$. For example, where elliptical curve cryptography is being utilized, that value may be a sum of the public keys associated with each node in the cyclically-ordered set from the particular node through to the initiator node.

From the operation 1120, control flow proceeds to an operation 1130. At the operation 1130, a second value, locking value $Q_{i+1}$, is determined based on $Q_i$ in manners described above. In other words, the locking value is determined based on the first value, $Q_i$, and on the public key, $P_i$, associated with the particular node. For example, where elliptical curve cryptography is being utilized and $Q_i=P_i+\ldots+P_{n-1}+P_s$, determining the locking value $Q_{i+1}$ may include subtracting the public key associated with the particular node, $P_i$, from the received value.

From the operation 1130, control flow proceeds to an operation 1140 where $U_i$ creates a payment channel between $U_i$ and $U_{i+1}$. In doing so, various transactions will be prepared as described above. For example, a transaction, $T_{pay}$, is prepared using the locking value. That transaction is, as described above, arranged to transmit a resource—e.g., x units of computing resources—from a source address associated with the particular node to a receiving address of a node immediately subsequent to the particular node—i.e., $U_{i+1}$—in the cyclically-ordered set. According to that transaction, control of the resource is to be transmitted responsive to satisfaction of an execution condition including supply of an unlocking value ($sv_{i+1}$) corresponding to the locking value.

Figure 12:
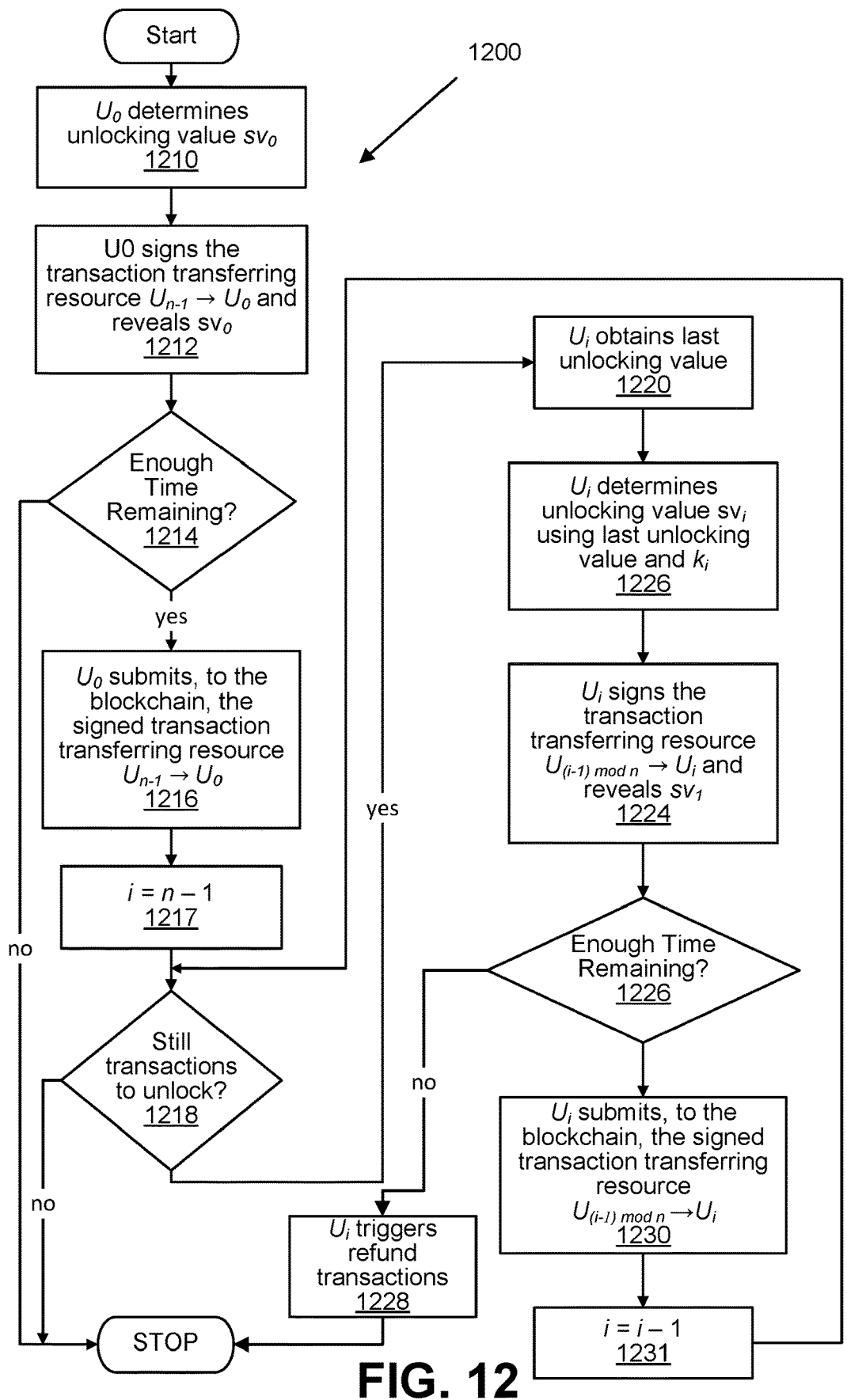
FIG. 12 is a flowchart illustrating operations performed by nodes of FIG. 3.

Referring to FIG. 12, a flowchart illustrates further operations performed by nodes 300 acting in cooperation to complete the payment transactions of each of the payment transaction established in manners described above. Operations 1210 and onward are performed by one or more processors of various of the nodes 300. As such, operations 1210 and onward are performed by one or more processors of computing devices, such as, for example, the processor 410 (FIG. 4) of suitably configured instances of the example computing device 400 executing software comprising computer-executable instructions as may be stored on a computer-readable storage medium such as for, example, storage of the memory 420.

At the operation 1210, the initiator node $U_0$ determines an unlocking value $sv_0$ for unlocking the $T_{pay}$ transaction in favour of $U_0$. Recall that the locking value employed to lock each transaction is based on the public key associated with the nodes that follow the particular node in the cyclically-ordered set through to the initiator node. This means that in the case of the aforementioned $T_{pay}$ transaction, the value locking the transaction is based only on the public key of the initiator node, $P_s$ corresponding to the private key $k_s$. As such, the unlocking value is based on $k_s$. For example, it may be that $sv_0=k_s$.

Next, control flow proceeds to an operation 1212 where $U_0$ signs the $T_{pay}$ transaction in favour of $U_0$. Put differently, $U_0$ may sign the transaction that, when submitted to the blockchain, will transfer resource $U_{n-1} \rightarrow U_0$. For example, $U_0$ may sign the corresponding $T_{pay}$ transaction and may input $sv_0$ into the unlocking script—e.g. into the redeemScript shown in table 800 (FIG. 8).

$U_0$ also reveals $sv_0$. For example, it may be that $U_0$ sends $sv_0$ to $U_1$ by way of a transmission over the computer network 310.

Alternatively, $U_0$ may rely on $U_1$ retrieving $sv_0$ from the blockchain such as, for example, when the transaction $T_{pay}$ is submitted thereto at an operation 1216 (described below). Notably, where retrieval of $sv_0$ from the blockchain is relied upon, the value s should be chosen such that the time period provides sufficient time for any participant to find the value after that transaction is submitted to the blockchain network, taking into account the average time to confirm a transaction on a particular blockchain.

From the operation 1212, control flow proceeds to an operation 1214.

At the operation 1214, it is determined whether sufficient time remains for $U_0$ to submit, to the blockchain, the $T_{pay}$ transaction in favour of $U_0$. In other words, it is determined whether the time S+s has occurred (t<S+s, where t is the current time).

If the check at the operation 1214 fails (not enough time), GRELR is aborted. Alternatively, if the check succeeds, control flow proceeds to the operation 1216.

At the operation 1216, the signed $T_{pay}$ transaction in favour of $U_0$ is submitted to the blockchain. In other words, the transaction transferring resource $U_{n-1} \rightarrow U_0$ is submitted to the blockchain.

From the operation 1216, control flow proceeds to an operation 1217. At the operation 1217, a counter, i, is initialized. In particular, because transactions will be unlocked in a counter-clockwise direction around the ring 600 (FIG. 6), i, is initialized to the index of the node preceding the initiator node in the cyclically-ordered set—e.g., i=n−1.

Flow control proceeds from the operation 1217, to an operation 1218. At the operation 1218 it is determined whether there are still $T_{pay}$ transactions to unlock. In other words, it is determined whether i>0. If no, GRELR is completed. Alternatively, if yes, control flow proceeds to an operation 1220.

At the operation 1220, the last unlocking value ($sv_{(i+1) \bmod n}$) is obtained by the node $U_i$. For example, the value may have been received from the preceding node such as for, example at the operation 1212 or an operation 1224 (described below), as the case may be. Alternatively, the value may be determined from a transaction submitted to the blockchain, such as, for example, from a transaction submitted at the operation 1216 or at an operation 1230 (described below), as the case may be.

From the operation 1220, control flow proceeds to an operation 1222. At the operation 1222, $U_i$ determines the unlocking value $sv_i$ using the last unlocking value obtained at the operation 1120 and the private key associated with $U_i$.

An example of such a determination follows.

First, recall that the value used to lock the transaction transferring resources from $U_{(i-1) \bmod n}$ to $U_i$ is based on the public key associated with each node from $U_i$ through to the initiator node $U_0$ in the cyclically-ordered set. The transaction may be unlocked using the corresponding private key.

Regarding the locking value (the public key), recall that where the elliptical curve cryptography is employed, the locking value may be determined as the sum $Q_i = P_i + \ldots + P_{n-1} + P_s$.

Further, recall that in elliptical curve cryptography P=kG. Also recall that, according to the homomorphic property of elliptical curve addition, E(m+n)=E(m)+E(n), where E is the function E(x)=xG.

Further, recall that $P_i = k_i G$. Accordingly, $Q_i = k_i G + \ldots + k_{(n-1)} G + k_s G = G(k_1 + \ldots + k_{(n-1)})$. Observe that, therefore, a private key corresponding to a public key $Q_i$ is the sum of the secret values $k_i + k_{i+1} + \ldots k_{n-1} + k_s$.

Put differently, the unlocking value corresponding to the locking value Q, that is the sum of public keys associated with each node in the cyclically-ordered set from the particular node through to the initiator node may be a private key obtained by summing the private keys associated with each of those public keys—i.e. the sum of the values $k_i$ associated with each node in the cyclically-ordered set from the particular node through to the initiator node.

Notably, this is made possible by the homomorphic property. Accordingly, another method of combining values could be utilized that has a similar homomorphic property such as for example, various homomorphic hash functions as may be known to persons skilled in the art. Additionally or alternatively, while homomorphic addition is illustrated above, homomorphism may exist over other operations. Accordingly, in some implementations homomorphism over operations other than addition may be exploited.

Returning to FIG. 12, following the operation 1222, control flow advances to an operation 1224. At the operation 1224, $U_i$ signs the $T_{pay}$ transaction in favour of $U_i$. Put differently, signs the transaction that, when submitted to the blockchain, will transfer resource $U_{(i-1) \bmod n} \rightarrow U_i$. For example, $U_i$ may sign the corresponding $T_{pay}$ transaction and may input $sv_i$ into the unlocking script—e.g. into the redeemScript shown in table 800 (FIG. 8).

$U_i$ also reveals $sv_i$. For example, it may be that $U_i$ sends $sv_i$ to $U_{i-1}$ by way of a transmission over the computer network 310. Alternatively, $U_i$ may rely on $U_{i-1}$ retrieving $sv_0$ from the blockchain such as, for example, when the transaction $T_{pay}$ is submitted thereto at the operation 1230 (described below).

Following the operation 1224, control flow proceeds to an operation 1226.

At the operation 1226, it is determined whether sufficient time remains to allow submission, to the blockchain, of the $T_{pay}$ transaction in favour of $U_i$. In other words, it is determined whether the time S+(n−i)s has occurred—i.e., whether t<(n−i)S+s, where t is the current time, is satisfied.

If the check fails, control flow proceeds to an operation 1228. Alternatively, if the check succeeds control flow proceeds to the operation 1230.

At the operation 1228, the lack of sufficient remaining time is handled by having $U_{i-1}$ trigger undo and abort of GRELR by triggering the refund transactions. In particular, $U_{i-1}$ submits to the block chain its respective refund transaction, $T_r$, thereby starting a process of having nodes $U_i$ to $U_0$ submitting their respective refund transactions to the blockchain.

At the operation 1230, given there is sufficient remaining time, $U_i$ submits, to the blockchain, the signed $T_{pay}$ transaction transferring some resource from $U_{i-1}$ to $U_i$.

From the operation 1230, control flow proceeds to an operation 1231 where the counter, i, is decremented and then control flow returns to the operation 1218 to determine if further transactions exist to unlock.

Conveniently, in this way, the secret values, $sv_i$, are revealed and the payment transactions may be unlocked. An overview of the various values (including the various secret values $sv_i$) to the nodes 300 in the cyclically-ordered sets relationship is shown in a diagram 1300 in FIG. 13.

Figure 13:
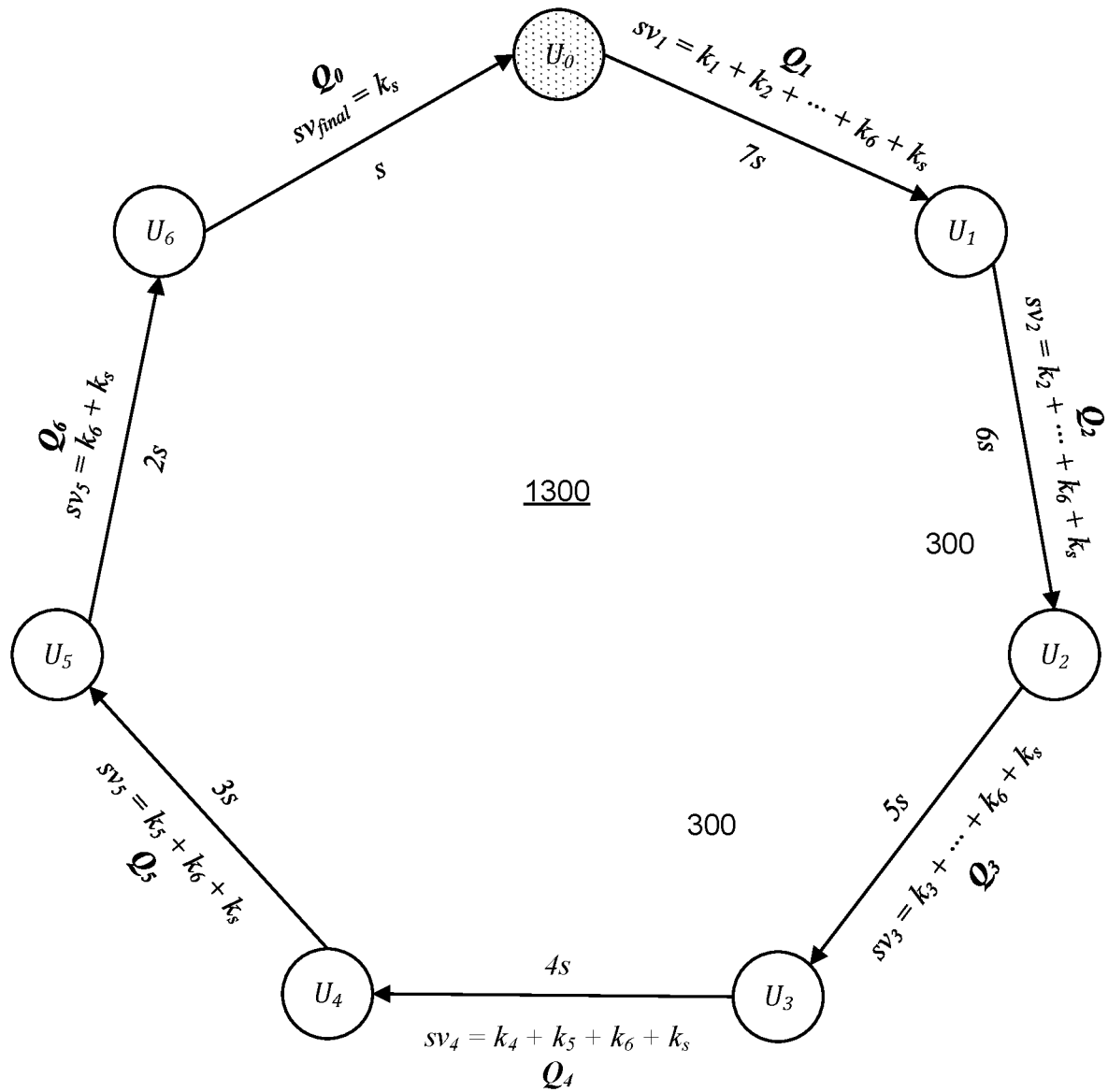
FIG. 13 is a diagram illustrating transfers between nodes in the cyclically-ordered set of FIG. 6.

In FIG. 13, arrows signify the direction of $T_{pay}$ payment. Expressions externally adjacent the arrows represent the criteria for transaction $T_{pay}$ to be accepted by the blockchain. Expressions internally adjacent the arrows represent the s time span values.

Figure 14:
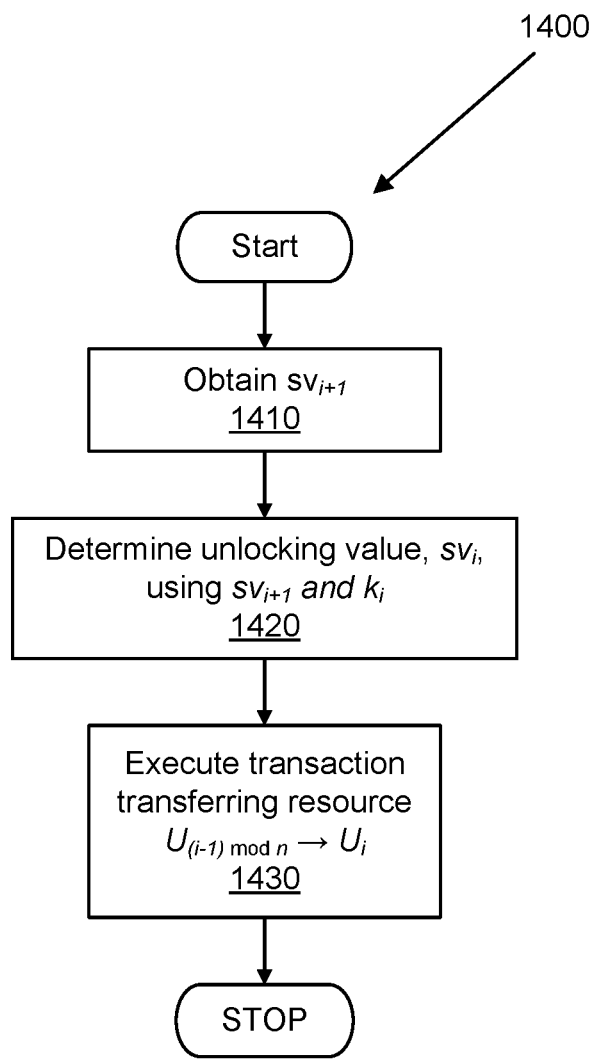
FIG. 14 is a flowchart illustrating operations performed by a particular node of FIG. 3.

FIG. 14 will now be discussed. FIG. 14 shows a flowchart 1400 illustrating operations performed by a particular node of FIG. 3 in carrying out operations in accordance with the flowchart 1200. Operations 1410 and onward are performed by one or more processors of a particular, non-initiator one of the nodes 300. As such, operations 1410 and onward are performed by one or more processors of a computing device, such as, for example, the processor 410 (FIG. 4) of a suitably configured instance of the example computing device 400 executing software comprising computer-executable instructions as may be stored on a computer-readable storage medium such as for, example, storage of the memory 420.

At the operation 1410, the value $sv_{i+1}$ is obtained. Recall that $sv_{i+1}$ is based on the secret values $k_i$ associated with each node following the particular node, $U_i$ through to the initiator node $U_0$. Furthermore, recall that each of $k_i$ is a private key corresponding to the public keys $P_i$. In other words, by obtaining $sv_{i+1}$ a third value is obtained that is based on private keys corresponding to the public keys associated with each node in the cyclically-ordered set from the node immediately subsequent to the particular node through to the initiator node.

Notably the value $sv_{i+1}$ may, as described above, be received from the node $U_{i+1}$—i.e. from the immediately subsequent node. Additionally or alternatively, the value may be extracted from a transaction already submitted to the blockchain as described above.

Further, recall that in some implementations $sv_{i+1}$ may be a sum $k_{i+1} + \ldots + k_n \cdot 1 + k_s$ such as, for example, when elliptical key cryptography is employed. Put differently, the value $sv_{i+1}$ may be a sum of the private keys, $k_i$, corresponding to the public keys, $P_i$, associated with each node in the cyclically-ordered set from the node immediately subsequent to the particular node through to the initiator node.

Following the operation 1410, control flow proceeds to an operation 1420. At the operation 1420, a second unlocking value $sv_i$ is determined based on the unlocking value $sv_{i+1}$ and the private key, $k_i$, associated with the particular node (and corresponding to the public key $P_i$). From example, where elliptical key cryptography is employed in a particular implementation, determining the second unlocking value may include adding the private key, $k_i$, associated with the particular node (and corresponding to the public key $P_i$) as described above.

Following the operation 1420, control flow proceeds to an operation 1430 where the transaction $T_{pay}$ transferring a resource to $U_i$ is executed. That $T_{pay}$ transaction is, as described above, prepared by the node immediately previous to $U_i$—i.e., $U_{(i-1) \mod n}$ and is arranged to transmit control of some resource from a source address associated with that immediately previous node to a receiving address associated with the particular node responsive to satisfaction of an execution condition including supply of the second unlocking value $sv_i$ as described above.

In addition to the operations described above, it may be that the second unlocking value is sent to the immediately previous node (e.g., as discussed above in the discussion of the operation 1224 (FIG. 12)).

Additionally or alternatively, it may be that the transaction in favour of $U_i$ is submitted to the blockchain by the particular node (e.g., as discussed above in the discussion of the operation 1230 (FIG. 12)).

It should be noted that the above-mentioned embodiments illustrate rather than limit the subject matter of the present invention, and that those skilled in the art will be capable of designing many alternative embodiments without departing from the scope of the invention as defined by the appended claims. In the claims, any reference signs placed in parentheses shall not be construed as limiting the claims. The word "comprising" and "comprises", and the like, does not exclude the presence of elements or steps other than those listed in any claim or the specification as a whole. In the present specification, "comprises" means "includes or consists of" and "comprising" means "including or consisting of". The singular reference of an element does not exclude the plural reference of such elements and vice-versa. The subject matter of the present invention may be implemented by means of hardware comprising several distinct elements, and by means of a suitably programmed computer. In a device claim enumerating several means, several of these means may be embodied by one and the same item of hardware. The mere fact that certain measures are recited in mutually different dependent claims does not indicate that a combination of these measures cannot be used to advantage.

The invention claimed is:

1. A computer-implemented method comprising:
randomizing a set of nodes to create a cyclically-ordered set of nodes participating in a blockchain network;
selecting one of the nodes of the set of nodes to be an initiator node, $U_0$, of the cyclically-ordered set of nodes;
selecting one or more timeout values representing an amount of time required to complete actions relating to the method;
determining and sending a public key associated with a particular node in the cyclically-ordered set of nodes participating in the blockchain network to the initiator node of the cyclically-ordered set;
receiving, by the particular node from a node immediately previous to the particular node in the cyclically-ordered set, a first value based on public keys associated with each node in the cyclically-ordered set from the particular node through to the initiator node;
determining, by the particular node, a locking value based on the first value and the public key associated with the particular node;
determining that there is sufficient time left on the one or more timeout values; and
establishing a payment channel between the particular node, $U_i$, and a node immediately succeeding the particular node, $U_{i+1}$, by:
preparing, by the particular node, (i) a commitment transaction, $T_c$, (ii) a refund transaction $T_r$, and (iii) a transaction, $T_{pay}$, using the locking value, arranged to transmit control of a resource from a source address associated with the particular node to a receiving address of the node immediately succeeding the particular node in the cyclically-ordered set, wherein the control of the resource is to be transmitted responsive to satisfaction of an execution condition including supply of an unlocking value corresponding to the locking value.

2. The method of claim 1 wherein the unlocking value is based on private keys corresponding to the public keys associated with each node in the cyclically-ordered set from the immediately subsequent node through to the initiator node.

3. The method of claim 1 wherein the first value is a sum of the public keys associated with each node in the cyclically-ordered set from the particular node through to the initiator node.

4. The method of claim 3 wherein determining the locking value comprises subtracting the public key associated with the particular node from the first value.

5. The method of claim 1 further comprising:
sending, by the particular node to the immediately subsequent node, a second value based on the first value and the public key associated with the particular node.

6. The method of claim 5 wherein the second value is determined by subtracting the public key associated with the particular node from the first value.

7. The method of claim 1 wherein another transaction is arranged to return control of the resource to the particular node upon satisfaction of a return condition.

8. The method of claim 1 further comprising:
obtaining, a third value based on private keys corresponding to the public keys associated with each node in the cyclically-ordered set from the immediately subsequent node through to the initiator node;
determining, by the particular node, a second unlocking value based on the third value and a private key corresponding to the public key associated with the particular node; and
executing, by the particular node, a second transaction prepared by the immediately previous node and arranged to transmit control of a second resource from a source address associated with the immediately previous node to a receiving address of the particular node, wherein control of the second resource is to be transmitted responsive to satisfaction of an execution condition including supply of the second unlocking value.

9. The method of claim 8 wherein the third value is received from the immediately subsequent node.

10. The method of claim 8 wherein the third value is extracted from a transaction submitted to a blockchain of the blockchain network.

11. The method of claim 8 wherein the third value is a sum of a-private keys corresponding to the public keys associated with each node in the cyclically-ordered set from the immediately subsequent node through to the initiator node.

12. The method of claim 8 further comprising sending the second unlocking value to the immediately previous node.

13. The method of claim 1 wherein each public key and its corresponding private key form an elliptical curve cryptography public-private key pair.

14. The method of claim 1 further comprising submitting a second transaction to a blockchain of the blockchain network.

15. The method of claim 8 wherein the resource and the second resource are identical.

16. A computing device adapted to serve as a particular node in a cyclically-ordered set, the computing device comprising:
a processor;
a memory;
a network interface; and
a non-transitory computer-readable storage medium storing computer-executable instructions that, when executed by the processor cause the computing device to perform a method according to claim 1.

17. A non-transitory computer-readable storage medium storing instructions that adapt a computer system to serve as a particular node in a cyclically-ordered set wherein the instructions, when executed by a processor of the computer system, cause the computer system to perform a method according to claim 1.

18. A computing device adapted to serve as a particular node in a cyclically-ordered set, the computing device comprising:
a processor;
a memory;
a network interface; and
a non-transitory computer-readable storage medium storing computer-executable instructions that, when executed by the processor cause the computing device to perform a method according to claim 2.

19. A computing device adapted to serve as a particular node in a cyclically-ordered set, the computing device comprising:
a processor;
a memory;
a network interface; and
a non-transitory computer-readable storage medium storing computer-executable instructions that, when executed by the processor cause the computing device to perform a method according to claim 8.

* * * * *